US012629622B2

(12) United States Patent
Platt et al.

(10) Patent No.: US 12,629,622 B2
(45) Date of Patent: May 19, 2026

(54) FILTRATION MEDIA AND FILTERS

(71) Applicant: DelStar Technologies, Inc., Alpharetta, GA (US)

(72) Inventors: Andrew G. Platt, Middletown, DE (US); Yasar Kiyak, Middletown, DE (US); Lenny Pompeo, Middletown, DE (US)

(73) Assignee: DelStar Technologies, Inc., Alpharetta, GA (US)

( * ) Notice: Subject to any disclaimer, the term of this patent is extended or adjusted under 35 U.S.C. 154(b) by 323 days.

(21) Appl. No.: 18/464,484

(22) Filed: Sep. 11, 2023

(65) Prior Publication Data
US 2024/0082763 A1      Mar. 14, 2024

Related U.S. Application Data

(60) Provisional application No. 63/406,686, filed on Sep. 14, 2022.

(51) Int. Cl.
| | |
|---|---|
| *B01D 39/16* | (2006.01) |
| *D06M 15/53* | (2006.01) |
| *D06M 15/643* | (2006.01) |

(52) U.S. Cl.
CPC ........... *B01D 39/163* (2013.01); *D06M 15/53* (2013.01); *D06M 15/643* (2013.01); *D06M 15/6436* (2013.01)

(58) Field of Classification Search
None
See application file for complete search history.

(56) References Cited

U.S. PATENT DOCUMENTS

| | | | |
|---|---|---|---|
| 4,406,950 | A | 9/1983 | Roesel, Jr. |
| 6,338,814 | B1 | 1/2002 | Hills |
| 6,616,435 | B2 | 9/2003 | Lee et al. |
| 6,861,142 | B1 | 3/2005 | Wilkie et al. |
| 6,972,104 | B2 | 12/2005 | Haynes et al. |
| 7,252,493 | B1 | 8/2007 | Johnston et al. |
| 7,300,272 | B1 | 11/2007 | Haggard |
| 7,309,430 | B2 | 12/2007 | Hills |
| 7,422,071 | B2 | 9/2008 | Wilkie et al. |
| 7,431,869 | B2 | 10/2008 | Haggard et al. |
| 7,504,348 | B1 | 3/2009 | Hagewood et al. |
| 7,727,915 | B2 | 6/2010 | Skirius et al. |
| 7,772,456 | B2 | 8/2010 | Zhang et al. |
| 7,774,077 | B1 | 8/2010 | Ford |
| 8,017,534 | B2 | 9/2011 | Harvey et al. |
| 8,057,583 | B2 | 11/2011 | Grove, III et al. |
| 9,522,357 | B2 | 12/2016 | Kwok et al. |
| 9,993,761 | B2 | 6/2018 | Kwok et al. |

| | | | | |
|---|---|---|---|---|
| 10,279,290 | B2 | | 5/2019 | Christopher et al. |
| 10,362,922 | B2 | | 7/2019 | Achenbach |
| 10,400,372 | B2 | | 9/2019 | Shirotani et al. |
| 2009/0266759 | A1 | | 10/2009 | Green |
| 2010/0031619 | A1 | * | 2/2010 | Grove, III .......... B01D 39/2024 427/244 |
| 2013/0333121 | A1 | * | 12/2013 | Weihrather ........ C08G 18/8077 442/164 |
| 2014/0273689 | A1 | * | 9/2014 | Carroll ................. D06N 3/0011 442/123 |
| 2017/0173508 | A1 | | 6/2017 | Christopher et al. |
| 2017/0321059 | A1 | * | 11/2017 | Yang ...................... C09D 5/024 |
| 2020/0216979 | A1 | | 7/2020 | Pourdeyhimi et al. |
| 2022/0362697 | A1 | * | 11/2022 | Sealey .............. B01D 39/2024 |
| 2023/0321568 | A1 | | 10/2023 | Platt et al. |
| 2023/0321569 | A1 | * | 10/2023 | Platt ........................ B01D 46/12 |
| 2023/0323055 | A1 | * | 10/2023 | Platt ........................ C09J 129/04 |
| 2024/0082763 | A1 | * | 3/2024 | Platt .................. D06M 15/6436 |
| 2025/0276264 | A1 | * | 9/2025 | Kiyak .................... B01D 39/18 |
| 2025/0297428 | A1 | * | 9/2025 | Wang .................... D21H 21/14 |

FOREIGN PATENT DOCUMENTS

| | | | | | |
|---|---|---|---|---|---|
| KR | 20140037942 | A | * | 3/2014 | ............ B01J 35/39 |
| KR | 20210106643 | A | * | 8/2021 | ............ D06M 13/02 |
| KR | 20250126152 | A | * | 8/2025 | ............ C08L 97/005 |
| TH | 2301001103 | A | * | 7/2025 | |

OTHER PUBLICATIONS

International Search Report and Written Opinion; International Application No. PCT/US2023/032377; Jan. 8, 2024.
Boyaci et al., "Electrospun amino-functionalized PDMS as a novel SPME sorbent for the speciation of inorganic and organometallic arsenic species", RSC Aadvances, vol. 3 (Sep. 19, 2013): pp. 22261-22268; entire document.
Jiachao et al., "Particle Size Refinement of Zn Electrodeposits in Alkaline Zincate Solutions with Poly (ethylene glycol) (12) Tridecyl Ether, Part II", International Journal of Electrochemical Science, vol. 13 (Dec. 1, 2017): pp. 324-332; entire document.

(Continued)

*Primary Examiner* — Brit E. Anbacht
(74) *Attorney, Agent, or Firm* — Farber LLC

(57) ABSTRACT

Filter media and filters, such as air filters, residential air filters, commercial air filters, face masks, gas turbine and compressor air intake filters, panel filters, and the like, are provided that comprise a plurality of fibers with a silicone-based coating. The silicone-based coating comprises a silicone compound at least about two percent by weight of the coating. The silicone-based coating may include a reactive silicone macroemulsion and a surfactant. The silicone-based coating increases the efficiency of the filter at capturing contaminants, particularly contaminants in the E2 and E3 particle group range, without compromising other important characteristics of the filters, such as cost, longevity, dust holding capacity, and the pressure drop or air permeability of the filter.

23 Claims, No Drawings

(56)                    References Cited

OTHER PUBLICATIONS

International Preliminary Report on Patentability (IPRP); International Application No. PCT/US2023/032377; dated Mar. 27, 2025.

* cited by examiner

FILTRATION MEDIA AND FILTERS

CROSS-REFERENCE TO RELATED APPLICATIONS

This application claims the benefit of U.S. Provisional Application Ser. No. 63/406,686, filed Sep. 14, 2022, the complete disclosure of which is incorporated herein by reference for all purposes.

TECHNICAL FIELD

This description generally relates to filtration media with improved performance characteristics and more particularly to gas filters incorporating silicon-based coatings that improve the efficiency of the filter at capturing contaminants.

BACKGROUND

Liquid and gas filters trap contaminants of many different types from the air, water, or others. Air filters, for example, typically include a filtration media comprising fibrous or porous materials which remove solid particulates, such as dust, pollen, mold, and bacteria from the air.

Two main types of air filtration devices include surface filters and depth filters. Surface filters, such as membranes or films, act as a barrier for contaminants that are captured before they enter the media structure. These surface filters typically have a submicron pore size and narrow pore size distribution. Surface filters tend to have relatively high particle capturing efficiency. However, they also have a relatively high pressure drop and a low dust loading capacity. The high pressure drop results in reduced air flow through the filter. The low dust loading capacity significantly reduces the longevity of the filter. As such, surface filters have been used in a limited number of applications in the air filtration industry.

Depth filters are commonly employed in air filtration devices with a moderate to high efficiency, a low pressure drop, and a relatively high dust loading capacity. Depth filters generally employ various kinds of fibers that may be formed into a web or other nonwoven structure having tortuous paths between the fibers through which a gas stream, such as air, is passed. The particulate matter in the gas flowing through the paths in the web is retained on the upstream side of the web, or within the tortuous paths of the web due to the size of the particles relative to the paths' diameters.

Conventional residential and commercial air filters, such as HVAC filters, are typically rated by the filter's ability to capture particles between about 0.3 and 10 microns. This rating, referred to as a Minimum Efficiency Reporting Value or MERV is developed by the American Society of Heating, Refrigerating and Air Conditioning Engineers (ASHRAE). The MERV ratings range from 1-16, with higher values indicating higher efficiencies at trapping specific types of particles. It is also common to compare efficiency values depending on particle sizes within the air stream during testing. E3, E2, and E1 values refer to particulate efficiency at 3-10 microns, 1-3 microns and 0.3 to 1 microns, respectively.

To increase the efficiency of such air filters in capturing particle contaminants, chemical treatments, additives, or coatings may be applied to the fibers before or after the filter media is formed. Such coatings may be applied, for example, by spraying, dipping, foaming, or other known manufacturing techniques. For example, silicon-based coatings have been applied to fibers to increase the efficiency of the filter media. Such coatings are described in, for example, U.S. Pat. No. 10,279,290. In another example, silicone and/or wax additives have been added to the outermost surface of filter media after it has been formed, as described in U.S. Pat. No. 8,057,583.

SUMMARY

The following presents a simplified summary of the claimed subject matter in order to provide a basic understanding of some aspects of the claimed subject matter. This summary is not an extensive overview of the claimed subject matter. It is intended to neither identify critical elements of the claimed subject matter nor delineate the scope of the claimed subject matter. Its sole purpose is to present some concepts of the claimed subject matter in a simplified form as a prelude to the more detailed description that is presented later.

Filtration media and filters, such as gas or liquid filters, are provided that include fibers having a silicone-based coating. The filter media provided herein may be particular useful in air filters, hydrocarbon filters, diesel filters, fluid filters, microfiltration membranes, face masks, CPAP filters, vacuum bags, gas turbine, and compressor air intake filters, panel filters, cartridge filters, bag filters, clean-in-place (CIP) filters, battery separators and the like. Systems and methods of manufacturing such filtration media and filters are also provided.

In one aspect, a filter media comprises a layer containing one or more fibers coated with a silicone-based coating. The silicone-based coating comprises a silicone compound of at least about 2% of the total weight of the coating. The applicant has discovered that directly coating the fibers with the silicone-based coatings described herein substantially improves the efficiency of such filters at capturing contaminants, particularly contaminants in the E2 and E3 particle group range. In addition, this coating does not substantially compromise other important characteristics of the filters, such as cost, longevity, dust holding capacity, and the pressure drop or air permeability of the filter.

Fibrous structures have a tortuous pore path due to layered fibrous webs. In other words, the pore shape of nonwovens is not cylindrical. Typically, the air stream during the filtration operation is through the thickness of the filter media. Therefore, when contaminants passing through the filtration media strike a fiber surface, they are either captured by fibers or bounced back. The filters disclosed herein reduce the amount of particles bouncing off the fiber surface and maintain a greater number of particles in contact with the fiber surface, resulting in greater particle capture.

In embodiments, the silicone-based coating includes a silicone compound diluted in water or other suitable fluid such that the silicone compound comprises at least about two percent by weight of the coating, or at least about five percent by weight of the coating. In an exemplary embodiment, the silicone compound comprises about 10% by the weight of the coating.

In embodiments, the weight of the silicone-based coating is greater than about 0.1% of the total weight of the fibers. In embodiments, the weight of the coating is greater than about 5% of the total weight of the fibers or about 6% to about 10% of the total weight of the fibers. In other embodiments, the weight of the coating may be greater than 10% of the total weight of the fibers.

In embodiments, the silicone-based coating comprises a reactive silicone macroemulsion. The silicone emulsion may comprise, for example, dimethyl silicone emulsions, amino type silicone emulsions, organo-functional silicone emulsions, resin type silicone emulsions, film-forming silicone emulsions, or the like. In one embodiment, the reactive silicone macroemulsion comprises an amino functional polydimethylsiloxane and/or a polyethylene glycol mono-tridecyl ether. In an exemplary embodiment, the amino functional polydimethylsiloxane comprises about 30 to about 40 percent by weight of the coating. In embodiments, the polyethylene glycol monotridecyl ether comprises about 5 to about 10 percent by weight of the coating.

The fibers may be staple fibers or continuous fibers. The fibers may be naked prior to application of the coating (i.e., zero spin finish). The fibers may include a spin finish prior to the application of the coating. In certain embodiments, the naked continuous fibers are spunbond or meltblown fibers. In other embodiments, the staple fibers have a conventional spin finish of less than about 2%.

In some embodiments, the silicone-based coating further comprises an antistatic agent. The antistatic agent may comprise a cationic antistatic agent, an anionic antistatic agent, a quaternary antistatic agent, or a surfactant. The surfactant may comprise a non-rewetting thermodegradable surfactant/foaming agent.

The fibers may be artificial or natural. Suitable materials for the fibers include, but are not limited to, polypropylene, polyesters (PET), PEN polyester, PCT polyester, polypropylene, PBT polyester, co-polyamides, polyethylene, high density polyethylene ("HDPE"), LLDPE, PLA, cross-linked polyethylene, polycarbonates, polyacrylates, polyacrylonitriles, polyfumaronitrile, polystyrenes, styrene maleic anhydride, polymethylpentene, cyclo-olefinic copolymer or fluorinated polymers, polytetrafluoroethylene, perfluorinated ethylene and hexfluoropropylene or a copolymer with PVDF like P(VDF-TrFE) or terpolymers like P(VDF-TrFE-CFE), propylene, polyimides, polyether ketones, cellulose ester, nylon and polyamides, polymethacrylic, poly(methyl methacrylate), polyoxymethylene, polysulfonates, acrylic, styrenated acrylics, pre-oxidized acrylic, fluorinated acrylic, vinyl acetate, vinyl acrylic, ethylene vinyl acetate, styrene-butadiene, ethylene/vinyl chloride, vinyl acetate copolymer, latex, polyester copolymer, carboxylated styrene acrylic or vinyl acetate, epoxy, acrylic multipolymer, phenolic, polyurethane, cellulose, styrene or any combination thereof. Other conventional fiber materials are contemplated. In some embodiments, bicomponent staple fibers such as HDPE/PET, PP/PET, CoPET/PET are preferred. In some embodiments, finish-free bicomponent fibers may be produced via bicospunbond technology, and then the coating is applied.

The fibers may have thicknesses that are suitable for the application. In some embodiments, the fibers have at least one dimension in the range of about 1 to about 10,000 micrometers or about 1 to about 1,000 micrometers or about 10 to 100 micrometers. The thickness of the fibers may also be measured in denier, which is a unit of measure in the linear mass density of fibers. In some embodiments, the fibers may have a linear density of about 1 denier to about 10 denier. The fibers may be configured as a gradient density media in which the pore size decreases from the upper surface of the filter (upstream) to the lower surface (downstream) or vice versa to increase capture efficiency and dust holding capacity.

In some embodiments, the fiber layer may comprise a "high loft" nonwoven material comprising spunbond or air through bonded carded nonwoven fibers. As used here in the term "high loft" means that the volume of void space is greater than the volume of the total solid. In air through bonded carded nonwoven fibers, the loftiness of a fiber layer can be controlled by various means known to those of skill in the art.

In certain embodiments, the fibers are biocomponent fibers having a core and a sheath. In embodiments, the core is eccentric with the sheath. In other embodiments, the core is concentric with the sheath.

In certain embodiments, the filter media comprises a nonwoven material that includes a substrate, sheet, layer, film, apertured film, mesh, or other media comprising fibers coated with the silicone-based coating.

In another aspect, an air filter, such as an HVAC filter, is provided having one or more fibers coated with a silicone-based coating that includes a silicone compound diluted in water or other suitable fluid such that the silicone compound comprises at least about two percent by weight of the coating, or at least about five percent by weight of the coating. In an exemplary embodiment, the silicone compound comprises about 10% by the weight of the coating.

The filter media comprising fibers coated with the silicon-based coating described herein may be used to manufacture supported, self-supported, pleated or flat-sheet (not pleated) air or HVAC filters with at least a minimum efficiency rating of MERV 6 according to ASHRAE 52.2. In some embodiments, the MERV rating is MERV 7, MERV 8, MERV 9, or even MERV 10.

In embodiments, the filter media comprises an improvement in an E3 filtration efficiency of about 30% or more compared to an E3 filtration efficiency value of fibers devoid of the silicone-based coating, or about 35% or more compared to an E3 filtration efficiency value of fibers devoid of the silicone-based coating or about 40% or more compared to an E3 filtration efficiency value of fibers devoid of the silicone-based coating.

In embodiments, the filter media comprises an improvement in an E2 filtration efficiency 2 of about 20% or more compared to an E2 filtration efficiency value of fibers devoid of the silicone-based coating.

In embodiments, the filter comprises a pressure drop that is less than 10% more than the pressure drop of a filter devoid of the silicone-based coating. In embodiments, the pressure drop is less than 5%, less than 1%, or less than 0.5% the pressure drop of a filter devoid of the silicone-based coating.

In embodiments, the filter comprises an air permeability that is within 5% of the air permeability of a filter devoid of the silicone-based coating. In embodiments, the air permeability is less than 1% of the air permeability of a filter devoid of the silicone-based coating.

In certain embodiments, the MERV rating of the filter media may be increased solely through the application of the silicone-based coating. In certain of these embodiments, the filter media's efficiency at removing E3 particles is at least about 5 points, at least about 10 points, at least 18 points or at least about 30 points. The MERV rating may be increased from MERV 7 to MERV 8, from MERV 8 to MERV 9, from MERV 7 to a MERV 9, or even from MERV 7 to MERV 10.

The filter may further a substantially rigid support layer bonded to the filter media. The fiber layer may comprise an extruded film comprising one or more apertures for the flow of or liquid therethrough. For example, the apertures can be hexagonal, circular, square, or diamond shaped.

The filter may include pleats. For example, the fiber layer may comprise at least one crease to form a pleat within the fiber layer. In another example, the filter further includes a plurality of pleats extending across a surface of the fiber layer. The fiber layer can be non-pleated.

In certain embodiments, the fibers in the filter media may be electrostatically charged such that, for example, contaminants are captured both with mechanical and electrostatic filtration. The electrostatic or electret fiber layer could be, for example, high loft triboelectric filter media made by carding and needling.

In another aspect, a method of making a filter media comprises providing a plurality of fibers and applying a silicone-based coating to the fibers. The coating includes a silicon compound of at least about 2 percent by weight of the coating, or at least five percent by weight of the coating. In an exemplary embodiment, the silicone compound comprises about 10% by the weight of the coating.

The coating is applied directly to the fibers after or prior to forming a fibrous web layer. The applicant has discovered that applying the coating directly to fibers increases the overall efficiency of the filter media, particularly at capturing contaminants in the E2 or E3 particle groups.

In some embodiments, the add-on weight of the silicone-based coating is greater than about 1% based on the total weight of the fibers. In certain embodiments, the add on weight is greater than about 5% based on the total weight of the fibers or about 6% to about 10% based on the total weight of the fibers.

In embodiments, the silicone-based coating comprises a reactive silicone macroemulsion. The silicone emulsion may comprise, for example, dimethyl silicone emulsions, amino type silicone emulsions, organo-functional silicone emulsions, resin type silicone emulsions, film-forming silicone emulsions or the like. In an exemplary embodiment, the reactive silicone macroemulsion comprises an amino functional polydimethylsiloxane and/or a polyethylene glycol monotridecyl ether.

The fibers can be manufactured by any suitable method, including, without limitation, meltblown, spunbond or spunlace, bicomponent spunbond, heat-bonded, carded, air-laid, wet-laid, extrusion, co-formed, needlepunched, stitched, hydraulically entangled or the like. In certain embodiments, naked continuous fibers are formed through a process selected from the group consisting of spunbond and meltblown. In other embodiments, staple fibers incorporating filter media are formed through carding, air-laid, wet-laid or similar processes.

In embodiments, the silicone-based coating is applied by any suitable process including, but not limited to, spraying the fibers with the silicone-based coating, dipping the fibers in a vessel containing the silicone-based coasting and applying the silicone-based coating as foam to the fibers.

The coating may be applied as a spin finish, or after a spin finish has been applied. The coating may be applied to naked fibers that have no spin finish. The coating may be applied to the staple fibers on which a typical spin finish is already applied.

The recitation herein of desirable objects which are met by various embodiments of the present description is not meant to imply or suggest that any or all of these objects are present as essential features, either individually or collectively, in the most general embodiment of the present description or any of its more specific embodiments.

DETAILED DESCRIPTION OF THE EMBODIMENTS

This description and the accompanying drawings illustrate exemplary embodiments and should not be taken as limiting, with the claims defining the scope of the present description, including equivalents. Various mechanical, compositional, structural, and operational changes may be made without departing from the scope of this description and the claims, including equivalents. In some instances, well-known structures and techniques have not been shown or described in detail so as not to obscure the description. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Except as otherwise noted, any quantitative values are approximate whether the word "about" or "approximately" or the like are stated or not. The materials, methods, and examples described herein are illustrative only and not intended to be limiting.

Filter media and filters, such as gas or liquid filters, face masks, CPAP filters, vacuum bags, cabin air filters, HVAC furnace filters, residential air filters, commercial air filters, gas turbine, and compressor air intake filters, panel filters and the like, are provided that include fibers having a silicone-based coating. Systems and methods of manufacturing such filters are also provided.

The silicone-based coating includes a silicone compound diluted in water or other suitable fluid such that the silicone compound comprises at least about 2 percent by weight of the coating, or at least about five percent by weight of the coating. In an exemplary embodiment, the silicone compound comprises about 10% by the weight of the coating. In an exemplary embodiment, the silicone compound comprises a silicone material, a surfactant, and water. The silicone and surfactant may together comprise about 10% weight of the overall coating.

The applicant has discovered that directly coating the fibers (as opposed to applying the coating to an outer surface of the already-formed filter media) with the silicone-based coating described herein substantially improves the efficiency of such filters at capturing contaminants, particularly contaminants in the E2 and E3 particle group range. In addition, this coating does not substantially compromise other important characteristics of the filters, such as cost, longevity, dust holding capacity, and the pressure drop or air permeability of the filter.

The weight of the silicone-based coating may be greater than about 0.1 percent of the total weight of the fibers. In exemplary embodiments, the weight of the coating is greater than about 5% of the total weight of the fibers or about 6% to about 10% of the total weight of the fibers.

In embodiments, the silicone-based coating comprises a reactive silicone macroemulsion. Silicone emulsions are insoluble silicones substantially evenly dispersed in water with the aid of a surfactant. The silicone emulsion may comprise, for example, dimethyl silicone emulsions, amino type silicone emulsions, organo-functional silicone emulsions, resin type silicone emulsions, film-forming silicone emulsions or the like. In an exemplary embodiment, the reactive silicone macroemulsion comprises an amino functional polydimethylsiloxane and/or a polyethylene glycol monotridecyl ether. In embodiments, the amino functional polydimethylsiloxane comprises about 30 to about 40 percent by weight of the coating. In embodiments, the polyethylene glycol monotridecyl ether comprises about 5 to about 10 percent by weight of the coating The fibers may be staple fibers or continuous fibers. The fibers may be naked prior to application of the coating (i.e., zero spin finish). The fibers may include a spin finish prior to the application of the coating. The spin finish may include but is not limited to, lubricants, emulsifiers, antistats, antimicrobial agents, cohesive agents and wetting agents. Other organic liquids, such as alcohols or blends of organic liquids may be added to the spin finish. The spin finish may be applied, for example, during carding of the fibers, during the melt spinning operation, or operation of drawing, crimping, and cutting of the fibers.

In embodiments, the silicone-based coating further comprise an antistatic agent. The antistatic agent may comprise a surfactant. The surfactant may comprise a non-rewetting thermodegradable surfactant/foaming agent.

In certain embodiments, the filter media comprises a nonwoven material that includes a substrate, sheet, layer, film, apertured film, mesh or other media comprising fibers The nonwoven fiber layer discussed herein may comprise a structure of individual fibers or threads that are interlaid, interlocked, or bonded together. Nonwoven fabrics may include sheets or web structures bonded together by entangling fiber or filaments (and by perforating films) mechanically, thermally, or chemically. They may be substantially flat, porous sheets that are made directly from separate fibers or molten plastic or plastic film. Examples of suitable nonwoven materials include, but are not limited to, fibers, layers or webs that are meltblown, spunbond or spunlace, heat-bonded, bonded carded, air-laid, wet-laid, co-formed, needlepunched, stitched, hydraulically entangled or the like.

In certain embodiments, the fiber layer may comprise a knitted and/or woven material. The knitted material may comprise any knitting pattern suitable for the desired application. Suitable knitted materials for filter applications include weft-knit, warp knit, knitted mesh panels, compressed knitted mesh, and the like. Suitable woven materials for filter applications include textile filter media, such as monofilament fabrics, multifilament fabrics, nylon mesh, polyester mesh, polypropylene mesh, and the like. Woven textiles may be used in, for example, mesh filter press cloths, woven filter pads and other die cut pieces, centrifuge filter bags, liquid filter bags, dust collector bags, bed dryer bags, rotary drum filters, filter belts, leaf filters, roll media and the like.

In some embodiments, the nonwoven material may include a structure comprising shortcut fibers and/or filaments that are intermingled or entangled. A shortcut fiber as used herein means a fiber of finite length. A filament as used herein means a fiber having a substantially continuous length. In some embodiments, the fiber layer may comprise shortcut coarse, microfibers and/or fine fibers. As used here a "fine fiber" means fibers having a diameter less than 1 micron, a "coarse fiber" means fibers having a diameter more than 10 micron, and a microfiber is a synthetic fiber having a diameter of less than 10 microns.

The contemplated fibers can be manufactured by any method, including, without limitation, the air laid or dry laid methods, carding, spinneret, gel spinning, melt spinning, wet spinning, dry spinning, islands-in-a sea staple or spunbond, segmented pie staple or spunbond, and others. Such methods are described in U.S. Pat. Nos. 4,406,950, 6,338, 814, 6,616,435, 6,861,142, 7,252,493, 7,300,272, 7,309,430, 7,422,071, 7,431,869, 7,504,348, 7,774,077 9,522,357, 9,993,761 and US Patent Publication No. 2009/266,759, the completed disclosures of which are hereby incorporated herein by reference for all purposes.

The fibers contemplated may have many shapes in cross-section, including without limitation, circular, kidney bean, dog bone, trilobal, barbell, bowtie, star, Y-shaped, and others. These shapes and/or other conventional shapes may be used with the embodiments to obtain the desired performance characteristics. The fibers stay connected to each other through thermal bonds and chemical bonds, by being entangled with one another, through the use of binding agents, such as adhesives, or the like.

The fibers may be artificial or natural. Suitable materials for the fibers include, but are not limited to, polypropylene, polyesters (PET), PEN polyester, PCT polyester, polypropylene, PBT polyester, co-polyamides, polyethylene, PLA, high density polyethylene ("HDPE"), LLDPE, cross-linked polyethylene, polycarbonates, polyacrylates, polyacrylonitriles, polyfumaronitrile, polystyrenes, styrene maleic anhydride, polymethylpentene, cyclo-olefinic copolymer or fluorinated polymers, polytetrafluoroethylene, perfluorinated ethylene and hexfluoropropylene or a copolymer with PVDF like P(VDF-TrFE) or terpolymers like P(VDF-TrFE-CFE), propylene, polyimides, polyether ketones, cellulose ester, nylon and polyamides, polymethacrylic, poly(methyl methacrylate), polyoxymethylene, polysulfonates, acrylic, styrenated acrylics, pre-oxidized acrylic, fluorinated acrylic, vinyl acetate, vinyl acrylic, ethylene vinyl acetate, styrene-butadiene, ethylene/vinyl chloride, vinyl acetate copolymer, latex, polyester copolymer, carboxylated styrene acrylic or vinyl acetate, epoxy, acrylic multipolymer, phenolic, polyurethane, cellulose, styrene or any combination thereof. Other conventional fiber materials are contemplated. In some embodiments, the coating is applied onto bicomponent fibers. Such bicomponent fibers can be produced via melt spinning, spunbonding, or meltblowing.

The fibers may include fibers of different sizes, with the fibers generally having diameters ranging from about 1 to about 1000 microns with lengths ranging from about one half to three inches. The fibers may be configured as a gradient density media in which the pore size decreases from the upper surface of the filter (upstream) to the lower surface (downstream) to increase capture efficiency and dust holding capacity. Alternatively, this structure may be reversed.

The fibers in the media may stay connected to other fibers by being thermally bonded, chemically bonded, or entangled with one another. Bicomponent fibers may be used, particularly with mechanical filtration, and these are formed by extruding two polymers from the same spinneret with both polymers contained within the same filament. Suitable materials for bicomponent fibers include, but are not limited to, polypropylene (PP)/polyethylene (PE), polyethylene terephthalate (PET)/polypropylene (PP), HIDPE/PET, PP/PET, CoPET/PET, and the like.

In some embodiments, the fiber layer may comprise a "high loft" nonwoven material comprising spunbond or air through bonded carded nonwoven fibers. As used here in the term "high loft" means that the volume of void space is greater than the volume of the total solid. In air through bonded carded nonwoven fibers, the loftiness of a fiber layer can be controlled by various means known to those of skill in the art. For example, loftiness can be increased by applying less compression force onto the media during bonding. In another example, a high loft nonwoven material can be manufactured with fibers having larger thicknesses, such as thicknesses greater than 3 denier, e.g., 5 denier or greater, 6 denier or greater (discussed in more detail below). In other embodiments, the loftiness may be increased by using eccentric biocomponent fibers.

The fibers may have thicknesses that are suitable for the application. In some embodiments, the fibers have at least one dimension in the range of about 1 to about 10,000 micrometers or about 1 to about 1,000 micrometers or about 10 to 100 micrometers. The thickness of the fibers may also be measured in denier, which is a unit of measure in the linear mass density of fibers. In some embodiments, the fibers may have a linear density of about 1 denier to about 10 denier.

In certain embodiments, a filter media may include at least two different fiber thicknesses or linear densities to provide at least two different layers of the filter within the same filter media. In certain embodiments, the filter media may include three or more separate portions or layers with different denier fiber ranges within each portion.

In some embodiments, the fiber layer may compromise additives, such as antibacterial and/or antiviral compositions such as silver, zinc, copper, organosilicone, tributyl tin, organic compounds that contain chlorine, bromine, or fluorine compounds.

The fibers may include biocomponent fibers that include two or more different fibers bonded to each other. The fibers may comprise the same material or different materials.

In certain embodiments, the fibers may be electrostatically charged such that, for example, contaminants are captured both with mechanical and electrostatic filtration. The fibers can be electrostatically charged using triboelectric methods, corona discharge, electrostatic fiber spinning, hydro charging, charging bars or other known methods. Corona charging is suitable for charging monopolymer fiber or fiber blend, or fabrics. Tribocharging may be suitable for charging fibers with dissimilar electronegativity. The electrostatic or electret fiber could comprise high loft triboelectric filter media made by carding and needling. Electrostatic fiber spinning combines the charging of the polymer and the spinning of the fibers as a one-step process. One suitable method for triboelectric charging is described in U.S. Pat. No. 9,074,301, the entire disclosure of which is hereby incorporated by reference herein for all purposes.

In certain embodiments, the nonwoven materials discussed herein may be included as part of a filter device that traps or absorbs contaminants, such as a liquid filter, a gas filter for home and commercial air filtration (e.g., HVAC), a surgical mask, or other face covering or the like. The filter device may be a mechanical filter, absorption filter, sequestration filter, ion exchange filter, reverse osmosis filter, surface filter, depth filter or the like, and may be designed to remove many different types of contaminants from the air, water, or others.

In some embodiments, the filter media may be scored, pleated, or folded into a pleated filter. The pleats may be formed by various conventional pleating operations that include, but are not limited to, bar, rotary, and star gear pleating operations. Filters include one or more support layers bonded to the filter media. In some embodiments, polymer layers, membranes or films are provided that include one or more apertures for flow of gas or liquid therethrough. In other embodiments, the material comprises a flexible surface layer for a finger bandage pad, a face mask or the like.

In one such embodiment, the nonwoven materials are incorporated into an air filter that removes particles and contaminants from the air, such as a HEPA filter (i.e., pleated mechanical air filter), a UV light filter, an electrostatic filter, a washable filter, a media filter, a spun glass filter, pleated or unpleated air filters, active carbon filters, pocket filters, V-bank compact filters, filter sheets, flat cell filters, filter cartridges and the like. The fibers may comprise a filter media for the air filter and may be supported by a support layer or a scrim layer, or may be included in other layers or materials.

Conventional home and commercial air filters, such as HEPA or pleated filters, are typically rated by the filter's ability to capture particles between about 0.3 and 10 microns. This rating, referred to as a Minimum Efficiency Reporting Value or MERV is developed by the American Society of Heating, Refrigerating and Air Conditioning Engineers (ASHRAE). The MERV ratings range from 1-16, with higher values indicating higher efficiencies at trapping specific types of particles. It is also common to compare efficiency values in depending on particle sizes within the air stream during testing. E3, E2 and E1 values refer to particulate efficiency at 3-10 microns, 1-3 microns, and 0.3 to 1 micron, respectively.

The MERV rating of the filter media discussed herein will vary based on many factors, including the types and sizes of fibers used in the filter media, the width of the filter media, the number and size of pleats (if any), and the like. Likewise, the pressure drop across the filter media will also depend on many factors, including those mentioned above.

In certain embodiments, the filter media comprising fibers coated with the silicon-based coating described herein may be used to manufacture supported, self-supported, or flat-sheet (not pleated) air or HVAC filters with at least a minimum efficiency rating (MERV) of MERV 6 according to ASHRAE 52.2. In some embodiments, the MERV rating is MERV 7, MERV 8, MERV 9, or even MERV 10.

In certain embodiments, the silicone-based coating increases the efficiency of a filter media in capturing contaminants in the E2 and/or E3 particle groups compared to a filter media devoid of the silicone-based coating. In these embodiments, the MERV rating of the filter media may be increased solely through the application of the silicone-based coating. In certain of these embodiments, the filter media's efficiency at removing E3 particles is at least about 5 points, at least about 10 points, at least 18 points, or at least about 30 points. The MERV rating may be increased from MERV 7 to MERV 8, or from MERV 8 to MERV 9, or from MERV 7 to a MERV 9 or even a MERV 10.

In certain embodiments, the fiber layer is a filter media for a gas filter, such as an HVAC filter. In embodiments, the filter media comprises an improvement in an E3 filtration efficiency of about 30% or more compared to an E3 filtration efficiency value of fibers devoid of the silicone-based coating, or about 35% or more compared to an E3 filtration efficiency value of fibers devoid of the silicone-based coating or about 40% or more compared to an E3 filtration efficiency value of fibers devoid of the silicone-based coating.

In embodiments, the filter media comprises an improvement in an E2 filtration efficiency of about 20% or more compared to an E2 filtration efficiency value of fibers devoid of the silicone-based coating.

In embodiments, the filter comprises a pressure drop tested that is less than 10% more than the pressure drop of a filter devoid of the silicone-based coating. In embodiments, the pressure drop is less than 5%, less than 1%, or less than 0.5% the pressure drop of a filter devoid of the silicone-based coating.

In embodiments, the filter comprises an air permeability that is within 5% of the air permeability of a filter devoid of the silicone-based coating. In embodiments, the air permeability is less than 1% of air permeability of a filter devoid of the silicone-based coating.

Other types of filters that may be developed with the nonwoven material disclosed herein include conical filter cartridges, square end cap filter cartridges, pocket filters, V-bank compact filters, panel filters, flat cell filters, pleated or unpleated bag cartridge filters, and the like.

In certain embodiments, the nonwoven material may be included in a thin film or layer that includes apertures, pores or perforations. The apertures may be embossed in a pattern (such as circular, diamond-shaped, hexagonal, oblong, triangular, rectangular, etc.) and then stretched until apertures form in the thinned out areas created by the embossing. Such an apertured substrate can be formed from many polymers, such as polypropylene, polyethylene, high density polyethylene ("HDPE"), and the like. The polymer layer may, for example, comprise an extruded film. An apertured film is available commercially and is marketed under the trademark Delnet®. The substrate is provided in a roll and nanofibers are deposited into the substrate in a roll-to-roll process.

The fibers can be manufactured by any suitable method, including, without limitation, meltblown, spunbond or spunlace, heat-bonded, carded, air-laid, wet-laid, extrusion, co-formed, needlepunched, stitched, hydraulically entangled or the like.

In certain embodiments, naked continuous fibers are formed through a process selected from the group consisting of spunbond and meltblown. In one example, the system may comprise a spunbond line, wherein filaments are formed by spinning molten polymer and stretching the molten filaments. Fiber bundles of filaments are separated and spread, and then and layered on a net to form a web. The fibers are bound in the form of a sheet through thermal bonding and embossing. The fiber stream may, for example, be introduced before the attenuation zone or before the bonding (consolidation) process.

In another example, the fibers may be formed with meltblowing dies. Examples of suitable meltblowing dies that may be utilized for manufacturing nonwoven materials are discussed in more detail in U.S. Pat. Nos. 6,972,104, 8,017,534 and 7,772,456 and US Patent Application No. US20200216979A1, the complete disclosures of which are incorporated herein by reference in their entirety for all purposes.

In other embodiments, staple fibers are formed through carding, air-laid, wet-laid, or similar processes. In one example, the system may comprise one carding machine or two carding machines disposed in-series with each other. Short fiber lengths are processed through fiber opening, blending, and consolidation into a continuous fibrous web. Once the fibrous web has been formed from carding, a secondary process of bonding may be used to give the fibrous web integrity and strength. This bonding process may be accomplished through chemical, thermal or mechanical methods.

The coating is preferably applied directly to the fibers prior to forming a fibrous web layer. Applicant has discovered that applying the coating directly to fibers (as opposed to applying it to a surface of the already-formed filter media) increases the overall efficiency of the filter media, particularly at capturing contaminants in the E2 or E3 particle groups.

In embodiments, the silicone-based coating is applied by any suitable process including, but not limited to, spraying the fibers with the silicone-based coating, dipping the fibers in a vessel containing the silicone-based coasting, and applying the silicone-based coating as foam to the fibers.

The coating may be applied as a spin finish, or after a spin finish has been applied. The coating may be applied to naked fibers that have no spin finish.

EXAMPLES

The applicant conducted four separate experiments with various fibers in a filter media. The fibers were tested before and after coating with a silicone-based coating on the fibers. The testing measured the pressure drop across each filter media and the initial fractional efficiency of the filter media for three separate particle groups: (1) E1 particles having a size of about 0.3 microns to 1 micron; (2) E2 particles having a size of about 1 micron to 3 microns; and (3) E3 particles having a size of about 3 microns to about 10 microns. The test was conducted filtration velocity at 180 feet per minute. All MERV ratings (based on flat sheet fractional efficiency testing) reported here are predicted MERV ratings.

The coating included a silicone compound of reactive silicone macroemulsion, a non-wetting thermodegradable surfactant/foaming agent, and water. The fibers were pad finished (although in some cases no finish was applied) and the coating was applied to the fibers and then allowed to dry for 3 minutes at 240 degrees F. In the first trial, the coating only contained 10 grams of the silicone compound, 1 gram of surfactant and 989 grams of water. Thus the coating contained about 1% silicone compound by weight. In the second, third and fourth trials, the percentage of silicone compound and surfactant were increased to 100 grams of silicone compound and 10 grams of surfactant for 890 grams of water (i.e., about 10% silicone compound by weight).

TABLES 1 and 2 below illustrate the results of the first trial. This trial was conducted for 3 different samples and the average is reported. Note that G6 spin finish is the regular spin finish of Fibervisions, Inc. while G8 is a special finish for filtration applications. Both spin finishes are applied during fiber production. G8 spin finish coated fibers have higher efficiency compared to G6 spin finish coated fibers. Staple fibers are defined as non-continuous fibers of a relatively short length. The filter media was tested before and after coating. The filter media was made of bicomponent fibers with a G6 spin finish. The fibers were carded and then thermally bonded. The coating formulation included 1% silicone compound, 0.1% surfactant, and 98.9% water. As shown in TABLE 2, the efficiency of the filter media increased with the coating in all three particle groups, with the highest increase of over 12 percent in the E3 particle groups (from 55.5 to 62.4). This increase, however, was insufficient to change the MERV rating of the filter media. The change in pressure drop was negligible.

TABLE 1

| | Pressure Drop (inch H20) at 500 CFM | E1 | E2 | E3 | MERV Rating |
|---|---|---|---|---|---|
| Before Treatment | 0.0818 | 0.9 | 26.9 | 55.5 | 7 |
| After Treatment | 0.0814 | 1.3 | 28.6 | 62.4 | 7 |

TABLE 2

| % Change in Basis Weight | % Change in Air Perm | % Change in Pressure Drop | % Change in E2 Efficiency | % Change in E3 Efficiency |
|---|---|---|---|---|
| 0.7 | 2.3 | −0.5 | 6.4 | 12.9 |

TABLES 3-5 illustrate the results of the second trial. This trial was conducted with 5 different samples of staple fibers having a G6 finish in a MERV 7 filter media. The results in TABLES 3-5 are the average of all 5 samples. The coating was increased to 10% silicone compound and 1% surfactant, and 89% water. As shown, the efficiency of the filter media increased with the coating in all three particle groups, with the highest increase of 18.8 points or over 35 percent in the E3 particle groups. This increased the overall MERV rating of the filter from MERV 7 to MERV 8. The increase in pressure drop was negligible. Air permeability decreased by only 0.9%. The change in basis weight with the coating was 8.3%. Thus, the coating significantly increased the filtration efficiency of the filter media at E3 zone without substantially increasing pressure drop or air permeability. In addition, the dust holding capacity of the filter media was only decreased from 8.37 grams of dust per square foot (gsf) to 8.15 gsf (see TABLE 5).

TABLE 3

| | Pressure Drop (inch H20) at 500 CFM | E1 | E2 | E3 | MERV Rating |
|---|---|---|---|---|---|
| Before Treatment | 0.0862 | 1.0 | 28.0 | 53.3 | 7 |
| After Treatment | 0.0863 | 1.5 | 31.9 | 72.1 | 8 |

TABLE 4

| % Change in Basis Weight | % Change in Air Perm | % Change in Pressure Drop | % Change in E2 Efficiency | % Change in E3 Efficiency |
|---|---|---|---|---|
| 8.3 | −0.9 | 0.1 | 13.7 | 35.2 |

TABLE 5

| Sample | Dust Holding Capacity (grams of dust/ft$^2$ |
|---|---|
| Before Treatment | 8.37 |
| After Treatment | 8.15 |

Comparing the results of the first and second trials indicates that increasing the weight percentage of the silicone compound in the coating substantially increased the efficiency of the filter media.

TABLES 6 and 7 illustrate the results of the third trial. This trial tested two separate filter media. The first filter media included 5 samples of discontinuous or staple fibers where half of the fibers were already coated with G8 spin finish (labeled Staple). The results in TABLES 6 and 7 illustrate the average of all 5 samples. As shown, the coating did not improve the efficiency of the filter media in particle groups E1 or E2, while it did slightly increase the efficiency in particle group E3 by 6.2 percent, which increased the overall MERV rating of the filter from MERV 8 to MERV 9.

The second filter media included 5 samples of continuous fibers manufactured through spunbonding techniques (labeled CON). The fibers were naked meaning that they did not include a filtration coating or spin finish. The results in TABLES 6 and 7 illustrate the average of all 5 samples. As shown, the efficiency of the filter media increased with the coating in the E2 particle group by 23% and the E3 particle group by 23.8 points or over 38%. This increased the overall MERV rating of the filter from MERV 7 to MERV 10. The increase in pressure drop was only 8.2%. Air permeability decreased by only 1.6%. The change in basis weight with the coating was 6.8%. Thus, the coating significantly increased the filtration efficiency of the filter media in the E2 and E3 particle groups with minimally affecting pressure drop or air permeability.

TABLE 6

| Sample | | Pressure Drop (inch H20) at 500 CFM | E1 | E2 | E3 | MERV Rating |
|---|---|---|---|---|---|---|
| Staple | Before Treatment | 0.1042 | 1.5 | 37.4 | 72.6 | 8 |
| Staple | After Treatment | 0.1064 | 1.1 | 36.2 | 77.1 | 9 |
| CON | Before Treatment | 0.1584 | 4.7 | 42.9 | 62.8 | 7 |
| CON | After Treatment | 0.1714 | 3.6 | 52.8 | 86.6 | 10 |

TABLE 7

| Sample | % Change in Basis Weight | % Change in Air Perm | % Change in Pressure Drop | % Change in E2 Efficiency | % Change in E3 Efficiency |
|---|---|---|---|---|---|
| Staple | 7.6 | 4.1 | 2.1 | −3.1 | 6.2 |
| CON | 6.8 | 1.6 | 8.2 | 23.0 | 38.2 |

The third trial indicates that the silicone-based coating is more effective with naked fibers that have not been coated prior to the application of the silicone-based coating.

TABLES 8-11 illustrate the results of a fourth trial. This trial tested two samples each of multiple bicomponent spunbond continuous fibers (each fiber labeled with a name, such as 5-2, 4B3, etc.). The results indicate the average of the two samples for each fiber. TABLE 8 illustrates the sample weight, basis weight, thickness, and air permeability of each fiber prior to application of the silicone-based coating. All samples had a width and length of about 12 inches and an area of 144 in$^2$.

TABLE 8

| Name | Weight (g) | gsf | gsm | oxy | Air Perm (cfm): $1^{st}$ | Air Perm (cfm): $2^{nd}$ | Air Perm: Avg | Thickness (mils) |
|---|---|---|---|---|---|---|---|---|
| 5-2 | 5.57 | 5.96 | 64.1 | 1.89 | 670 | 666 | 668 | 90 |
| 4B3 | 5.96 | 5.55 | 59.7 | 1.76 | 747 | 671 | 709 | 100 |
| 4C3 | 5.55 | 5.41 | 58.2 | 1.72 | 648 | 618 | 633 | 90 |
| 5-3 | 5.41 | 5.54 | 59.6 | 1.76 | 567 | 517 | 542 | 30 |
| 6-2 | 5.54 | 5.37 | 57.8 | 1.71 | 593 | 541 | 567 | 30 |

TABLE 8-continued

| Name | Weight (g) | gsf | gsm | oxy | Air Perm (cfm): 1st | Air Perm (cfm): 2nd | Air Perm: Avg | Thick-ness (mils) |
|---|---|---|---|---|---|---|---|---|
| 5-4 | 5.37 | 5.58 | 60.1 | 1.77 | 525 | 470 | 498 | 25 |
| 4C4 | 5.58 | 5.97 | 64.3 | 1.90 | 636 | 618 | 627 | 85 |
| 4B4 | 5.97 | 5.44 | 58.5 | 1.73 | 733 | 736 | 735 | 100 |
| 6-1 | 5.44 | 5.61 | 60.4 | 1.78 | 633 | 564 | 599 | 30 |
| 5-1 | 5.61 | 6.20 | 66.7 | 1.97 | 603 | 594 | 599 | 65 |

TABLES 9-11 illustrate the results of filtration efficiency and pressure drop for each fiber before and after coating the fibers with the silicone-based compound. As shown, the coating produced a modest improvement in filtering E2 particles and a substantial improvement in filtering E3 particles. The average increase across all samples (TABLE 11) was a 6.4 increase in efficiency in E2 particle filtration and a 41.9 percent (or 22.8 points) increase in E3 particle filtration. The lowest change in E3 particle efficiency among all samples was still an increase of 32.83%.

The average pressure drop decrease caused by the silicone-based compound was only 4.9%, with the highest pressure drop decrease at 12.9%. Thus, the coating significantly increased the filtration efficiency of the filter media in the E3 particle groups without substantially increasing pressure drop across the filter.

TABLE 9

BEFORE TREATMENT

| Name | Pressure Drop (inch H20) at 500 CFM | E1 | E2 | E3 | MERV Rating |
|---|---|---|---|---|---|
| 5-2 | 0.0929 | 1.1 | 31.1 | 57.0 | 7 |
| 4B3 | 0.0750 | 0.3 | 25.2 | 50.3 | 7 |
| 4C3 | 0.0925 | 0.3 | 30.6 | 55.3 | 7 |
| 5-3 | 0.1177 | 1.5 | 38.8 | 57.6 | 7 |
| 6-2 | 0.1125 | 2.7 | 37.6 | 54.4 | 7 |
| 5-4 | 0.1370 | 2.7 | 39.5 | 51.0 | 7 |
| 4C4 | 0.0964 | 1.7 | 32.4 | 54.8 | 7 |
| 4B4 | 0.0768 | 0.3 | 25.0 | 52.9 | 7 |
| 6-1 | 0.1039 | 2.0 | 33.0 | 55.4 | 7 |
| 5-1 | 0.1019 | 1.5 | 32.5 | 58.5 | 7 |

TABLE 10

AFTER TREATMENT

| Name | Pressure Drop (inch H20) at 500 CFM | E1 | E2 | E3 | MERV Rating |
|---|---|---|---|---|---|
| 5-2 | 0.0925 | 1.5 | 32.6 | 75. | 8 |
| 4B3 | 0.0653 | 0.8 | 24.3 | 69.1 | 7 |
| 4C3 | 0.0921 | 1.1 | 34.3 | 77.2 | 8 |
| 5-3 | 0.1157 | 1.5 | 41.5 | 82.1 | 9 |
| 6-2 | 0.0980 | 1.6 | 37.7 | 80.1 | 9 |
| 5-4 | 0.1389 | 3.5 | 47.2 | 81.8 | 9 |
| 4C4 | 0.0960 | 1.6 | 37.1 | 78.6 | 9 |
| 4B4 | 0.0708 | 0.6 | 35.7 | 73.0 | 8 |
| 6-1 | 0.0929 | 0.9 | 32.7 | 80.1 | 8 |
| 5-1 | 0.0988 | 1.4 | 34.7 | 78.2 | 8 |

TABLE 11

| Name | % Change in Basis Weight | % Change in Pressure Drop | % Change in E2 Efficiency | % Change in E3 Efficiency | Number of Points Increased in E3 |
|---|---|---|---|---|---|
| 5-2 | −4.2 | −0.4 | 4.93 | 32.83 | 18.7 |
| 4B3 | 11.4 | −12.9 | −3.62 | 37.60 | 18.9 |
| 4C3 | 6.8 | −0.4 | 12.07 | 39.50 | 21.9 |
| 5-3 | 8.7 | −1.7 | 6.99 | 42.54 | 24.5 |
| 6-2 | 13.7 | −12.9 | 0.41 | 47.13 | 25.7 |
| 5-4 | 8.2 | 1.4 | 19.49 | 60.32 | 30.8 |
| 4C4 | −2.6 | −0.4 | 14.58 | 43.40 | 23.8 |
| 4B4 | 14.3 | −7.8 | 3.15 | 38.12 | 20.1 |
| 6-1 | 6.3 | −10.6 | −0.84 | 44.64 | 24.7 |
| 5-1 | −3.8 | −3.0 | 6.82 | 32.85 | 19.3 |
| Average | 5.9 | −4.9 | 6.40 | 41.90 | 22.8 |

In an alternative embodiment, the filter may also include nanoparticles incorporated into the fibers or filter media. As used herein, the term "nanoparticle" means any particle that has a dimension less than 1 micron in at least one axis or dimension. For example, a fiber having a diameter or width less than a micrometer and a length greater than 1 micrometer is a nanoparticle as used herein. The nanofibers may have a continuous length, or the nanofibers may have discrete length, such as 1 to 100,000 microns, preferably between about 100 to 10,000 microns.

In certain embodiments, the nanoparticles are dispersed "in depth" within the fiber layer. As used herein, the term "in depth" means that the nanoparticles are dispersed beyond a first surface of the fiber layer such that at least some of the nanoparticles are disposed between first and second opposing surfaces into the internal structure of the fiber layer or filter media. In certain embodiments, the nanoparticles are dispersed throughout substantially the entire media from the first surface to the opposing second surface. In other embodiments, the nanoparticles are dispersed through a portion of the media from the first surface to a location between the first and second surfaces.

The nanoparticles can be chosen with different triboelectric properties relative to the first or second fibers in order to use a triboelectric effect to enhance particle removal. With this method, the generated nanoparticles are formed in an electrical field and are less subject to contamination by chemicals that may moderate the triboelectric effect. Nanoparticles with different adsorption properties or surface charge characteristics than the coarse fibers can also be used, e.g. in oil or water filtration. This difference can be used to enhance or create localized electrical field gradients within the filter media to enhance particle removal. The nanoparticles and coarse fibers may have different wetting characteristics.

The nanoparticles may comprise any suitable material, such as glass, biosoluble glass, ceramic materials, acrylic, carbon, metal, such as alumina, polymers (such as nylon, polyethylene terephalate, and the like), polyvinyl chloride (PVC), polyolefin, polyacetal, polyester, cellulous ether, polyalkylene sulfide, poly(arylene oxide), polysulfone, modified polysulfone polymers and polyvinyl alcohol, polyamide, polystyrene, polyacrylonitrile, polyvinylidene chloride, polymethyl methacrylate, polyvinylidene fluoride and any combination thereof.

In some embodiments, the nanoparticles are bonded to the fibers via mechanical entanglement. This mechanical bond can be supplemented with an adhesive or binding agent. In certain embodiments, the nanoparticles are not crimped (i.e., they do not include significant wavy, bent, curled, coiled sawtooth or similar shape associated with the nanoparticle in a relaxed state. In other embodiments, the nanoparticles may have a crimped body structure with a discrete length. For instance, when these crimped nanofibers having a discrete length are attached to the fiber, they entangle among themselves and also with, onto, and around, the fiber with a firm attachment to form a modified fiber. In other embodiments, the attachment of the nanofibers to the micron fibers is accomplished via electrostatic charge attraction and/or Van der Waals force attraction between the fibers and the nanoparticles. A more complete description of filter media incorporating nanoparticles can be found in commonly assigned, co-pending U.S. provisional patent application Ser. No. 63/328,970, filed Apr. 8, 2022, the complete disclosure of which is incorporated herein by reference in its entirety for all purposes.

While the devices, systems and methods have been described in detail herein in accordance with certain preferred embodiments thereof, many modifications and changes therein may be effected by those skilled in the art. Accordingly, the foregoing description should not be construed to be limited thereby but should be construed to include such aforementioned obvious variations and be limited only by the spirit and scope of the following claims.

For example, in a first aspect, a first embodiment is a filter media comprising a layer containing one or more fibers. The fibers are coated with a silicone-based coating comprising a silicone compound at least about two percent by weight of the coating.

A second embodiment is the first embodiment, wherein the silicone compound is at least about five percent by weight of the coating.

A third embodiment is any combination of the first 2 embodiments, wherein the silicone compound is at least about 10% by weight of the coating.

A $4^{th}$ embodiment is any combination of the first 3 embodiments, wherein an add-on weight of the silicone-based coating is greater than about 1 percent based on a total weight of the fibers.

A $5^{th}$ embodiment is any combination of the first 4 embodiments, wherein the add-on weight is greater than about 5% based on the total weight of the fibers.

A $6^{th}$ embodiment is any combination of the first 5 embodiments, wherein the add-on weight is at about 6% to about 10% based on the total weight of the fibers.

A $7^{th}$ embodiment is any combination of the first 6 embodiments, wherein the fibers are staple fibers.

An $8^{th}$ embodiment is any combination of the first 7 embodiments, wherein the fibers are continuous fibers.

A $9^{th}$ embodiment is any combination of the first 8 embodiments, wherein the continuous fibers are spunbond or meltblown fibers.

A $10^{th}$ embodiment is any combination of the first 9 embodiments, wherein the silicone-based coating comprises a reactive silicone macroemulsion.

An $11^{th}$ embodiment is any combination of the first 10 embodiments, wherein the silicone-based coating comprises an amino functional polydimethylsiloxane.

A $12^{th}$ embodiment is any combination of the first 11 embodiments, wherein the silicone-based coating comprises polyethylene glycol monotridecyl ether.

A $13^{th}$ embodiment is any combination of the first 12 embodiments, wherein the amino functional polydimethylsiloxane comprises about 30 to about 40 percent by weight of the coating.

A $14^{th}$ embodiment is any combination of the first 13 embodiments, wherein the polyethylene glycol monotridecyl ether comprises about 5 to about 10 percent by weight of the coating.

A $15^{th}$ embodiment is any combination of the first 14 embodiments, wherein the silicone-based coating further comprising an antistatic agent.

A $16^{th}$ embodiment is any combination of the first 15 embodiments, wherein the antistatic agent comprises a surfactant.

A $17^{th}$ embodiment is any combination of the first 16 embodiments, wherein the surfactant comprises a non-re-wetting thermodegradable surfactant/foaming agent.

An $18^{th}$ embodiment is any combination of the first 17 embodiments, wherein the silicone-based coating is applied to the fibers by dipping the fibers in a vessel containing the silicone-based coating.

In a second aspect, a gas filter product comprising the filter media of any combination of the first 18 embodiments.

In a third aspect, an air filter product for use in a heating, ventilation and air conditioning (HVAC) system comprising the filter media of any combination of the first 18 embodiments.

In a $4^{th}$ aspect, a filter media comprises a layer comprising continuous fibers with a spin finish of less than about 1% and a silicone-based coating on the fibers, wherein an add-on weight of the silicone-based coating is greater than about 1 percent based on a total weight of the fibers.

A second embodiment is the first embodiment, wherein the spin finish is about 0%.

A third embodiment is any combination of the first 2 embodiments, wherein the add-on weight is at least about 5% based on the total weight of the fibers.

A $4^{th}$ embodiment is any combination of the first 3 embodiments, wherein the add-on weight is at about 8% to about 10% based on the total weight of the fibers.

A $5^{th}$ embodiment is any combination of the first 4 embodiments, wherein the filter media has an improvement in an E3 filtration efficiency of at least about 30% compared to an E3 filtration efficiency value of fibers devoid of the silicone-based coating.

A $6^{th}$ embodiment is any combination of the first 5 embodiments, wherein the filter media has an improvement in an E3 filtration efficiency about 35% or more compared to an E3 filtration efficiency value of fibers devoid of the silicone-based coating A $7^{th}$ embodiment is any combination of the first 6 embodiments, the filter media has an improvement in an E3 filtration efficiency about 40% or more compared to an E3 filtration efficiency value of fibers devoid of the silicone-based coating.

An $8^{th}$ embodiment is any combination of the first 7 embodiments, wherein the filter media comprises an improvement in an E2 filtration efficiency about 20% or more compared to an E2 filtration efficiency value of fibers devoid of the silicone-based coating.

A $9^{th}$ embodiment is any combination of the first 8 embodiments, wherein the silicone-based coating includes a silicone compound at least about two percent by weight of the coating.

A $10^{th}$ embodiment is any combination of the first 9 embodiments, wherein the silicone-based coating includes a silicone compound at least about five percent by weight of the coating.

An $11^{th}$ embodiment is any combination of the first 10 embodiments, wherein the silicone compound is at least about 10% by weight of the coating.

A 12th embodiment is any combination of the first 11 embodiments, wherein the silicone-based coating comprises a reactive silicone macroemulsion.

A 13th embodiment is any combination of the first 12 embodiments, wherein the silicone-based coating comprises an amino functional polydimethylsiloxane.

A 14th embodiment is any combination of the first 13 embodiments, wherein the silicone-based coating comprises polyethylene glycol monotridecyl ether.

A 15th embodiment is any combination of the first 14 embodiments, wherein the amino functional polydimethylsiloxane comprises about 30 to about 40 percent by weight of the coating.

A 16th embodiment is any combination of the first 15 embodiments, wherein the polyethylene glycol monotridecyl ether comprises about 5 to about 10 percent by weight of the coating.

A 17th embodiment is any combination of the first 16 embodiments, wherein the continuous fibers are spunbond or meltblown fibers.

An 18th embodiment is any combination of the first 17 embodiments, wherein the silicone-based coating further comprising an antistatic agent.

A 19th embodiment is any combination of the first 18 embodiments, wherein the antistatic agent comprises a surfactant.

A 20th embodiment is any combination of the first 19 embodiments, wherein the surfactant comprises a non-rewetting thermodegradable surfactant/foaming agent.

A 21st embodiment is any combination of the first 20 embodiments, wherein the silicone-based coating is applied to the fibers by dipping the fibers in a vessel containing the silicone-based coating.

In a 5th aspect, an air filter product comprises the filter media of any combination of the first 21 embodiments, In a 6th aspect, a first embodiment is a method of making filter media comprising providing a plurality of fibers and applying a silicone-based coating to the fibers, wherein the silicone-based coating includes a silicone compound at least about two percent by weight of the coating A second embodiment is the first embodiment, wherein the silicone compound is at least about five percent by weight of the coating.

A 3rd embodiment is any combination of the first 2 embodiments, wherein the silicone compound is at least about 10% by weight of the coating.

A 4th embodiment is any combination of the first 3 embodiments, wherein an add-on weight of the silicone-based coating is greater than about 1 percent based on a total weight of the fibers.

A 5th embodiment is any combination of the first 4 embodiments, wherein the add-on weight is greater than about 5% based on the total weight of the fibers.

A 6th embodiment is any combination of the first 5 embodiments, wherein the add-on weight is at about 6% to about 10% based on the total weight of the fibers.

A 7th embodiment is any combination of the first 6 embodiments, wherein the silicone-based coasting is applied by a process selected from the group consisting of spraying the fibers with the silicone-based coating, dipping the fibers in a vessel containing the silicone-based coasting and applying the silicone-based coating as foam to the fibers.

An 8th embodiment is any combination of the first 7 embodiments, further comprising forming the fibers with a process selected from the group consisting of spunbond and meltblown.

A 9th embodiment is any combination of the first 8 embodiments, wherein the silicone-based coating is applied as a spin finish.

A 10th embodiment is any combination of the first 9 embodiments, wherein the silicone-based coating is applied to the fibers prior to forming the filter media.

In a 7th aspect, an air filter is manufactured from the process in any combination of the first 10 embodiments.

What is claimed is:

1. A filter media comprising:
a layer containing fibers; and
wherein the fibers are coated with a silicone-based coating comprising a silicone compound at least about two percent by weight of the coating, wherein the silicone compound comprises a reactive silicone macroemulsion.

2. The filter media of claim 1, wherein the silicone compound is at least about five percent by weight of the coating.

3. The filter media of claim 1, wherein the silicone compound is at least about 10% by weight of the coating.

4. The filter media of claim 1, wherein an add-on weight of the silicone-based coating is greater than about 1 percent based on a total weight of the fibers.

5. The filter media of claim 4, wherein the add-on weight is greater than about 5% based on the total weight of the fibers.

6. The filter media of claim 4, wherein the add-on weight is at about 6% to about 10% based on the total weight of the fibers.

7. The filter media of claim 1, wherein the fibers are staple fibers.

8. The filter media of claim 1, wherein the fibers are continuous fibers.

9. The filter media of claim 1, wherein the silicone-based coating comprises an amino functional polydimethylsiloxane.

10. The filter media of claim 1, wherein the silicone-based coating comprises polyethylene glycol monotridecyl ether.

11. The filter media of claim 9, wherein the amino functional polydimethylsiloxane comprises about 30 to about 40 percent by weight of the coating.

12. The filter media of claim 10, wherein the polyethylene glycol monotridecyl ether comprises about 5 to about 10 percent by weight of the coating.

13. A gas filter product comprising the filter media of claim 1.

14. A filter media comprising:
a layer comprising continuous fibers with a spin finish of less than about 1%; and
a silicone-based coating on the fibers, wherein an add-on weight of the silicone-based coating is greater than about 1 percent based on a total weight of the fibers, wherein the silicone compound comprises a reactive silicone macroemulsion.

15. The filter media of claim 14, wherein the spin finish is about 0%.

16. The filter media of claim 14, wherein the add-on weight is at least about 5% based on the total weight of the fibers.

17. The filter media of claim 14, wherein the add-on weight is at about 8% to about 10% based on the total weight of the fibers.

18. The filter media of claim 14, wherein the filter media has an improvement in an E3 filtration efficiency of at least about 30% compared to an E3 filtration efficiency value of fibers devoid of the silicone-based coating.

19. The filter media of claim 14, wherein the filter media has an improvement in an E3 filtration efficiency about 35% or more compared to an E3 filtration efficiency value of fibers devoid of the silicone-based coating.

20. The filter media of claim 14, wherein the filter media has an improvement in an E3 filtration efficiency about 40% or more compared to an E3 filtration efficiency value of fibers devoid of the silicone-based coating.

21. The filter media of claim 14, wherein the filter media comprises an improvement in an E2 filtration efficiency about 20% or more compared to an E2 filtration efficiency value of fibers devoid of the silicone-based coating.

22. The filter media of claim 14, wherein the silicone-based coating includes a silicone compound at least about two percent by weight of the coating.

23. The filter media of claim 22, wherein the silicone compound is at least about 10% by weight of the coating.

\* \* \* \* \*